Patented Oct. 6, 1925.

1,556,488

UNITED STATES PATENT OFFICE.

LYLE CALDWELL, OF LOMPOC, CALIFORNIA, ASSIGNOR TO THE CELITE COMPANY, OF LOS ANGELES, CALIFORNIA, A CORPORATION OF DELAWARE.

INSULATING CEMENT OR MORTAR.

No Drawing.   Application filed January 29, 1923.   Serial No. 615,738.

*To all whom it may concern:*

Be it known that I, LYLE CALDWELL. a citizen of the United States, and resident of the city of Lompoc, Santa Barbara County, and State of California, have invented certain new and useful Improvements in Insulating Cement or Mortar, of which the following is a specification.

My invention relates in general to compositions employed for cement or mortar, and more particularly to those suitable for use in heat insulating constructions such as walls and coverings.

Heat insulating materials are usually porous and preferably of light weight. In the construction of heat insulating walls, porous bricks or blocks of diatomaceous earth in one form or another are extensively used and will serve as an important example of the kind of installation for which the present invention is designed. These bricks are of very light weight and extremely high porosity, the air cells being continuous and connected throughout the structure of the brick. When fire clay or ordinary mortars or cements are applied to the surface of such bricks, rapid absorption of the water from the mortar ensues with the result that, the mortar being deprived of much of this ingredient, it becomes difficult or almost impossible to lay the brick in a workmanlike manner and no bond is secured. One of the primary objects of our present invention is to provide a mortar or cement which is free from these disadvantages.

Another important consideration in the erection of heat insulating walls is found in the necessity that the joints be as thin as practicable. That is to say, the insulating quality of the cement or mortar is, in most cases, inferior to that of the brick and, for this reason, offers paths of correspondingly better conductivity for the passage of heat through the wall. Our present invention, accordingly, has in view as an additional object to provide a cement or mortar which is adapted to properly join together or unite the brick work with relatively thin or narrow joints while at the same time aiming to avoid undue heat conductivity of the cementing material itself.

A still further consideration, which frequently pertains to cements or mortars for the purposes described, is that they should possess good adhesive quality. The importance of this is illustrated for example in the case of forming heat insulating coverings or walls on the bottom or around the curved surfaces of metal tanks, boilers, digestors and the like. An additional object of the present invention is to provide a mortar which will give a sufficient temporary adhesion to a metal surface to hold the insulating material in place until permanently tied with wire, metal bands or the like.

The composition according to the present invention comprises in its preferred form, powdered diatomaceous earth and an organic adhesive substance such as animal bone or hide glues, fish glue, casein or waste sulphite pitch. These adhesive substances have the property of making the mass plastic when mixed with water and also provide the desired adhesiveness and retention of water against absorption into the adjacent porous materials with which they are to be used.

Cement or mortar prepared in accordance to these specifications will retain their plasticity for a period of time amply sufficient in which to work the insulating block or brick into the wall. Ordinary mortars will dry up and become useless by reason of the water being absorbed into the pores of the insulating material.

The composition of the mortar ordinarily used in forming insulating coverings of blocks or bricks of diatomaceous earth or other insulating material consist of 85–90% by weight of powdered diatomaceous earth and 10–15% by weight of glue ground to a suitable degree of fineness, intermixed and made plastic by addition of cold water.

This invention is not limited to these proportions, however, as larger amounts of adhesive may be used if the conditions under which it is to be applied call for development of a stronger bond than is usually the case, as, for instance, in applying brick to convex metal surfaces such as drum heads and drums. In certain cases the percentage of adhesive may be greatly reduced, as when the composition is to be used in horizontal or vertical work which is protected on either side by other structural materials. The character of adhesive used may also be changed to give the best results.

Insulating cements or compositions of the character specified have heretofore had serious disadvantages, namely, necessity of using hot water to develop proper plasticity and contains alkalies which injuriously affected the hands of workmen using such cements. The cement described in the present invention is free from these and other incidental disadvantages.

Insulating cements used with semi refractory insulating materials where the cement is exposed to high temperatures may be composed of powdered calcined diatomaceous earth and the adhesive substance, that is to say, the diatomaceous earth may be calcined before intermixing with the organic adhesive excessive shrinkage in the joints being eliminated in this way.

In connection with the composition above described I may also use an agent for increasing the gelatinizing action of the adhesive, gelatinous or protein substance used in the composition. For this purpose I may add to the composition above described, a small percentage, say, five per cent, of an electrolytic substance; namely, a salt or a solution of a salt, such as sodium chloride, borax, potassium sulfate, sodium sulfate, commercial alum, aluminum sulfate, ammonium sulfate, etc., or a mixture of any two or more of such salts. And in particular I may use with advantage a composition comprising about 83 parts by weight of finely divided diatomaceous earth, about ten parts bone glue, about five parts sodium carbonate, about two parts aluminum sulfate and about three hundred and fifty parts water. Caustic alkalies may also be used to advantage. The addition of such electrolytes to the gelatin, glue or other proteids used as an adhesive, increases the osmotic pressure, causing distension or swelling, so that smaller percentages of glue or other organic adhesive may be used to produce the required binding effect.

The addition of these salts will enable the mortar to absorb more water than a straight glue mortar, and the salt prevents the stuff from running down the sides of the wall which is being laid up, making a better appearing job and a stronger bond.

Other organic adhesives may be used in place of those above mentioned; for example, dextrin, flour or starch, paste, etc., and in such case a distending agent (salt, etc.) such as above described, may also be used to advantage.

It will be observed that in the above examples the percentage of diatomaceous earth is in each case over 80% and I prefer in general to use at least 80% diatomaceous earth in my composition. It will also be observed that in each case the principal other ingredient of the composition consists of glue or other organic adhesive in the proportion of 10 to 15% so that in any case the composition consists principally of diatomaceous earth and organic adhesive, to which may be added from five to seven per cent of one or more salts or chemicals adapted to act as a distending agent with respect to the glue or other organic adhesive.

What I claim is:

1. An insulating cement or mortar composition consisting principally of powdered diatomaceous earth and an organic adhesive and containing not over 7% of a salt adapted to act as a distending agent with respect to said organic adhesive.

2. An insulating cement or mortar composition consisting principally of powdered diatomaceous earth and glue and containing in addition approximately 5% sodium carbonate and 2% aluminum sulfate.

3. An insulating cement or mortar composition consisting principally of a mixture of powdered calcined diatomaceous earth and an organic adhesive and containing 7% or less of a salt adapted to act as a distending agent with respect to said organic adhesive.

4. An insulating cement or mortar composition comprising at least 80% powdered diatomaceous earth and containing as its principal other ingredient an organic adhesive and also containing 7% or less of a salt adapted to act as a distending agent with respect to said organic adhesive.

5. An insulating cement or mortar composition comprising approximately 83% powdered diatomaceous earth, 10% of an organic adhesive. 5% sodium carbonate, and 2% aluminum sulfate.

6. An insulating cement or mortar composition comprising approximately 83% powdered diatomaceous earth, 10% glue, 5% sodium carbonate and 2% aluminum sulfate.

7. An insulating cement or mortar made by mixing 83 parts by weight of finely divided diatomaceous earth, 10 parts of organic adhesive, 5 parts sodium carbonate and 2 parts aluminum sulfate, with 350 parts of water.

In testimony whereof I have hereunto subscribed my name this 12th day of January, 1923.

LYLE CALDWELL.